(12) United States Patent
Aldaz Riera et al.

(10) Patent No.: US 11,127,968 B2
(45) Date of Patent: Sep. 21, 2021

(54) ACID-BASED ELECTROCHEMICAL FLOW BATTERY

(71) Applicants: UNIVERSIDAD DE ALICANTE, San Vicente del Raspeig (ES); Marian CARROLL DARBY, Campello (ES)

(72) Inventors: Antonio Aldaz Riera, San Vicente del Raspeig (ES); Vicente Montiel Leguey, San Vicente del Raspeig (ES); Alfonso Sáez Fernández, San Vicente del Raspeig (ES)

(73) Assignee: UNIVERSIDAD DE ALICANTE, San Vicente del Raspeig (ES)

( * ) Notice: Subject to any disclaimer, the term of this patent is extended or adjusted under 35 U.S.C. 154(b) by 349 days.

(21) Appl. No.: 15/748,430

(22) PCT Filed: Jul. 26, 2016

(86) PCT No.: PCT/ES2016/070565
§ 371 (c)(1),
(2) Date: Jun. 29, 2018

(87) PCT Pub. No.: WO2017/017303
PCT Pub. Date: Feb. 2, 2017

(65) Prior Publication Data
US 2018/0301731 A1 Oct. 18, 2018

(30) Foreign Application Priority Data
Jul. 30, 2015 (ES) .............................. ES201531141

(51) Int. Cl.
*H01M 8/18* (2006.01)
*H01M 8/04082* (2016.01)
(Continued)

(52) U.S. Cl.
CPC ....... *H01M 8/188* (2013.01); *H01M 8/04201* (2013.01); *H01M 10/34* (2013.01);
(Continued)

(58) Field of Classification Search
CPC ........... H01M 8/188; H01M 8/08; H01M 8/14
See application file for complete search history.

(56) References Cited

U.S. PATENT DOCUMENTS 3,282,834 A  11/1966  Justi et al.
5,087,534 A  2/1992  Ludwig
(Continued)

FOREIGN PATENT DOCUMENTS

WO  WO 88/02931 A2  4/1988

OTHER PUBLICATIONS

International Search Report and Written Opinion issued in PCT/ES2016/070565 dated Nov. 14, 2016.

*Primary Examiner* — Sarah A. Slifka
*Assistant Examiner* — Rachel L Zhang
(74) *Attorney, Agent, or Firm* — Arent Fox LLP

(57) ABSTRACT

The present invention relates to a system and process for the accumulation of electrical energy, the system containing an electrochemical reactor comprising: an electrode compartment comprising molecular hydrogen, an electrode compartment comprising a liquid phase (a), an electrode compartment comprising a liquid phase (b), a catalytic surface comprising an electrocatalyst for the oxidation reaction of hydrogen, a catalytic surface comprising an electrocatalyst for the reduction reaction of water and an ion exchange membrane, wherein electrode compartment and electrode compartment are separated from one another by the catalytic surface, electrode compartment is in turn separated from
(Continued)

electrode compartment by the ion exchange membrane and the free end of electrode compartment is in contact with the catalytic surface.

12 Claims, 7 Drawing Sheets

(51) Int. Cl.
  *H01M 14/00* (2006.01)
  *H01M 10/36* (2010.01)
  *H01M 10/34* (2006.01)

(52) U.S. Cl.
  CPC ........... *H01M 10/36* (2013.01); *H01M 14/00* (2013.01); *Y02E 60/50* (2013.01)

(56) References Cited

U.S. PATENT DOCUMENTS

| | | | | |
|---|---|---|---|---|
| 5,846,669 | A * | 12/1998 | Smotkin | H01M 8/00 |
| | | | | 429/500 |
| 2008/0248350 | A1* | 10/2008 | Little | C25B 15/08 |
| | | | | 429/443 |
| 2011/0189520 | A1* | 8/2011 | Carter | B60L 50/64 |
| | | | | 429/107 |
| 2014/0170511 | A1* | 6/2014 | Tolmachev | H01M 8/08 |
| | | | | 429/418 |
| 2015/0017494 | A1* | 1/2015 | Amstutz | H01M 8/188 |
| | | | | 429/70 |

\* cited by examiner

ACID-BASED ELECTROCHEMICAL FLOW BATTERY

CROSS-REFERENCE TO RELATED APPLICATIONS

This application is a National Stage entry of International Application No.: PCT/ES2016/070565, filed on Jul. 26, 2016, which claims priority to Spanish Patent Application No. P201531141, filed on Jul. 30, 2015. The disclosures of the priority applications are hereby incorporated in their entirety by reference.

TECHNICAL FIELD

The present invention relates to an electrical energy accumulation system which harnesses energy from the neutralization reaction of two solutions, one acidic and the other basic, converting it into electrical energy. In the electrical energy generation process (the system discharges and acts as a cell), the free energy released in the neutralization reaction of two highly concentrated solutions, one acidic and the other basic, separated by an ion exchange membrane is harnessed. During the discharging process, the concentration of the acidic and basic solutions decreases at the expense of providing electrical energy as a result of the neutralization process. In the charging process, electrical energy is injected to regenerate the initial state of the previous solutions. The redox processes of this electrochemical system are based on an oxidation reaction in which molecular hydrogen is oxidized to a proton and a reduction reaction in which water is reduced to molecular hydrogen and hydroxyl ions. Therefore, by assuming 100% efficiency, hydrogen consumption in these processes must be zero.

PRIOR ART

There is currently a large number of energy storage systems: those using the potential energy of compressed air system (CAES, Compressed Air Energy Storage) or pump-hydro system (PHS, Pump-Hydro Storage), those using the kinetic energy of systems with flywheels (FWES, FlyWheel Energy Storage), those using the direct accumulation of electric charge in capacitors and supercapacitors (EDLC, Electrical Dbl-Layer Capacitors) or those using the energy storage in rechargeable batteries with chemical systems such as the conventional lead-acid (Pb/A) battery or the more innovative lead-carbon (PbC) battery; the nickel-cadmium (Ni—Cd) system and nickel-metal hydride (Ni-MH) system, lithium-ion (Li-ion) system; systems which revolve around sodium such as a sodium-sulfur (Na—S) system, sodium-metal halide (Na-metal halide) system or the sodium-beta (NaBB, sodium beta batteries) system which uses β-alumina as a solid electrolyte, and finally redox flow batteries (RFB), in which the energy is stored in two reversible redox pairs the reagents of which are dissolved in a solvent and the higher or lower solubility and volume of which define the electric storage capacity of the system. The solutions used are defined as posilyte, which is located in the compartment of the positive electrode, and negalyte, which is located in the compartment of the negative electrode. The solutions are pumped from two storage receptacles to their respective compartments by means of two hydraulic pumps. Electrical energy is obtained spontaneously in the discharging process, and electrical energy is injected for restoring the composition of the solutions in the charging process.

In systems of this type, the electrode reactions of both redox pairs, which occur in the positive and negative electrodes, do not usually have the same Faradaic efficiency, so at the end of a certain number of charging/discharging cycles an imbalance in the charge contained in the solutions (state of charge), i.e., an imbalance in the concentrations of the active species, occurs, making it necessary to use a rebalancing system that offsets the lack of Faradaic synchronization of the processes (Z. Yang, J. Zhang, M. C. W. Kintner-Meyer, X. Lu, D. Choi, J. P. Lemmon, Electrochemical Energy Storage for Green Grid, Chemical Review, 111 (2011) 3577-3613; A. Z. Weber, M. M. Mench, J. P. Meyers, P. N. Ross, J. T. Gostick, Q. Liu, Redox flow batteries: a review, Journal of Applied Electrochemical, 41 (2011) 1137-1164).

In this same line, there is a type of redox flow batteries known as a hydrogen-based energy storage system (HESS), having hydrogen as one of the operating vectors; in these systems, the so-called charging process is performed by means of the electrolysis of water, which produces hydrogen and oxygen that can then be used in a hydrogen/oxygen cell for producing electrical energy (discharging process) (E. Varkaraki, N. Lymberopouloa, E. Zoulias, D. Guichardot, G. Poly, Hydrogen-based uninterruptible power supply, International Journal of Hydrogen Energy 32 (2007) 1589-1596).

There is therefore a need to provide an electrochemical battery for the accumulation of electrical energy that provides solutions to the inefficiencies described in the prior art relating to surge, Faradaic efficiency and reversibility of the processes, takes advantage of the self-consumption of hydrogen as a vector, uses simple and cost-effective substances which have a large theoretical energy storage capacity and eliminates the need to use an electrochemical rebalancing system.

DISCLOSURE OF THE INVENTION

The present invention solves the problems described in the prior art as it provides an electrical energy accumulation system which uses the energy resulting from the neutralization of two solutions, one acidic and the other basic, separated by an ion exchange membrane, and the production/self-consumption of hydrogen as the driving force of the present system.

Therefore in a first aspect, the present invention relates to a system for the accumulation of electrical energy (hereinafter, system of the present invention) characterized in that it contains an electrochemical reactor comprising an electrode compartment (3) comprising molecular hydrogen, an electrode compartment (5) comprising a liquid phase (a), an electrode compartment (9) comprising a liquid phase (b), a catalytic surface (4) comprising an electrocatalyst for the oxidation reaction of hydrogen, a catalytic surface (10) comprising the electrocatalyst for the reduction reaction of water and an ion exchange membrane (8), wherein electrode compartment (3) and electrode compartment (5) are separated from one another by the catalytic surface (4), electrode compartment (5) is in turn separated from electrode compartment (9) by the ion exchange membrane (8) and the free end of the electrode compartment (9) is in contact with the catalytic surface (10).

In a particular embodiment, the system of the present invention comprises tanks (1) and (1') for accumulating solutions (a) and (b), respectively.

In a particular embodiment, the system of the present invention comprises at least a drive pump (2) for distributing solution (a) from tank (1) to electrode compartment (5) and a drive pump (2') for distributing solution (b) from tank (1') to electrode compartment (9).

In a particular embodiment, the system of the present invention comprises a gas distribution system (6) distributing molecular hydrogen flow through the system In a particular embodiment, the system of the present invention comprises at least one valve system (7) distributing liquid flow through the system.

In a particular embodiment of the present invention, the free end of the electrode compartment (3) in turn contacts a catalytic surface (4'), which has the same characteristics as catalytic surface (4), which is in turn in contact with an electrode compartment (5') separated from electrode compartment (9') by an ion exchange membrane (8'), and electrode compartment (9') is in turn in contact with a catalytic surface (10').

In a second aspect, the present invention relates to a method for the accumulation of electrical energy (process of the present invention) in the system of the present invention, wherein said method comprises a discharging process for discharging the system in which electrical energy is generated from the free energy obtained in the neutralization reaction of two solutions, one being an acidic solution and the other a basic solution, and a charging process in which electrical energy is injected to regenerate the initial state of the previous solutions, characterized in that the overall hydrogen consumption is zero and in that it comprises the following steps:

i) preparing the system for the charging process by introducing the posilyte or acidic solution (a) located in tank (1) into electrode compartment (5) and the negalyte or basic solution (b) located in tank (1') into electrode compartment (9), supplying electrode compartment (3) with hydrogen,
ii) applying an electric current to the system,
iii) oxidizing hydrogen to hydronium ion on catalytic surface (4) and reducing water to hydrogen on catalytic surface (10), acidifying the solution defined as posilyte (a) and basifying the solution defined as negalyte (b),
iv) causing the transport of the ions of the supporting electrolyte of both solutions through the ion exchange membrane (8),
v) redirecting excess unconsumed hydrogen in electrode compartment (3) and the hydrogen generated in electrode compartment (9) to electrode compartment (3) by means of the gas distribution system (6),
vi) stopping the charging, changing the solution defined as negalyte (b) from compartment (9) to compartment (5) and the solution defined as posilyte (a) from compartment (5) to compartment (9), inverting the polarity of the electrodes and starting the discharging process by means of generating a potential difference created by the difference in pH between the two solutions defined as posilyte and negalyte,
vii) oxidizing hydrogen to hydronium ion in the electrode in contact with the negalyte and reducing water to hydrogen in the electrode in contact with the posilyte, the liquid phases returning to the initial state defined in paragraph i).

In the present invention, posilyte (a) is understood to be a liquid phase made up of any acidic species, where it is preferable to use one of those acidic species known as strong acidic species. Furthermore, a common supporting electrolyte or background electrolyte, which can be any highly soluble salt, and preferably those salts the ionic mobility of which is very high, must be present.

In the present invention, negalyte (b) is understood to be a liquid phase made up of any basic species, where it is preferable to use one of those basic species known as strong basic species. Furthermore, a common supporting electrolyte or background electrolyte, which can be any highly soluble salt, and preferably those salts the ionic mobility of which is very high, must be present.

In a particular embodiment, (8) and (8') is an ion exchange membrane selected from a cation exchange membrane and an anion exchange membrane or a non-selective separator.

In a particular embodiment, the process of the present invention comprises a step prior to step i) of preparing the system for the charging process by introducing the posilyte or acidic solution into tank (1) and the negalyte or basic solution into tank (1'), pumping by means of the action of pumps (2, 2') the posilyte or acidic solution to electrode compartments (5), (5'), (9) and (9') and the negalyte or basic solution to electrode compartments (9), (9'), (5) and (5').

In another particular embodiment, the discharging process is performed in the same system as the charging process by means of inverting the polarity of the electrodes by changing the posilyte (a) from electrode compartment (5) to electrode compartment (9) and the negalyte (b) from electrode compartment (9) to electrode compartment (5), such that the oxidation of molecular hydrogen occurs on catalytic surface (4) and the oxidation of molecular hydrogen occurs on catalytic surface (10).

In another particular embodiment, the discharging process is performed in a system different from that of the charging method, such that this system comprises two electrode compartments (5), (5') and electrode compartments (9), (9'), two catalytic surfaces (4), (4') and (10), (10'), catalytic surfaces (4) and (10') being the negative electrodes and catalytic surfaces (4') and (10) being the positive electrodes.

In the present invention, the inefficiencies associated with charging/discharging processes are reduced to a minimum compared to the inefficiencies present in batteries existing on the market due to the low surge, the high reversibility of the processes involved (hydrogen oxidation/reduction) and the high, virtually 100%, Faradaic efficiency of the two reactions.

The system of the present invention furthermore has the following advantages compared to systems of the prior art:
i) it overcomes the lower energy efficiency of other systems;
ii) it makes the process design simpler compared to other processes,
iii) it reduces the cost per unit of energy supplied compared to other systems,
iv) it makes the reagents used in the process less hazardous compared to the reagents used in other systems,
v) it increases the energy storage capacity at this low cost,
vi) it reduces the inefficiencies of electrode processes, and finally
vii) it eliminates the need for an electrochemical rebalancing system.

DETAILED DISCLOSURE OF THE INVENTION

Figure 1A:
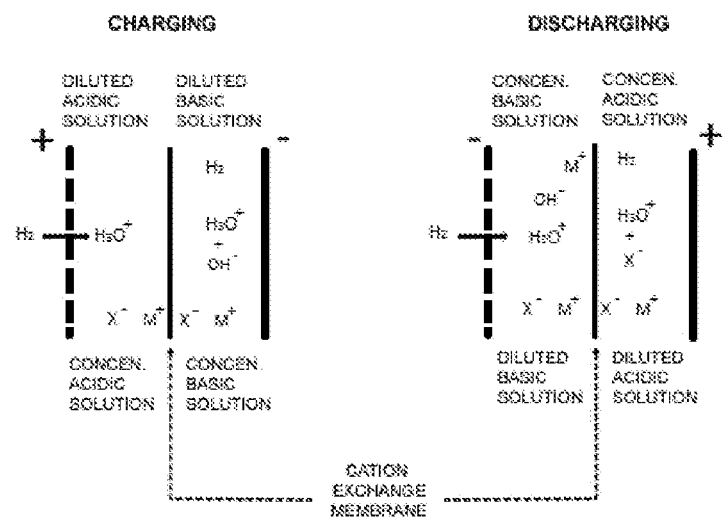
FIG. 1 shows a qualitative diagram of the reactions and ion transport that occur in the charging and discharging processes defined in this invention, using a) a cation exchange membrane and b) an anion exchange membrane as a compartment separator.
Figure 1B:
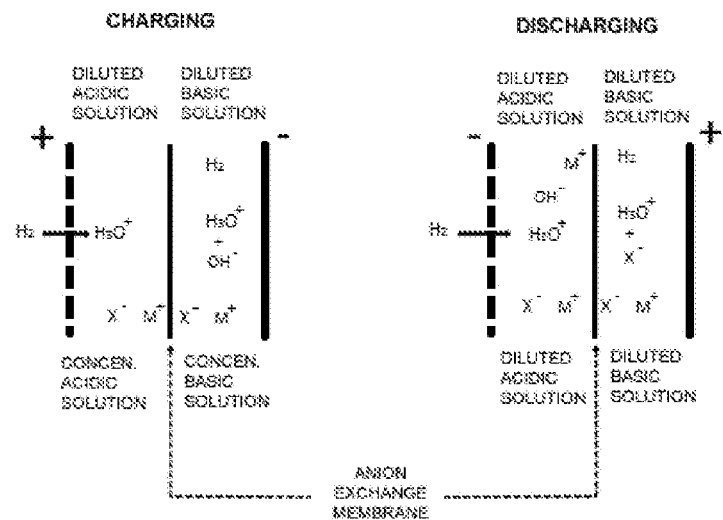
Figure 2:
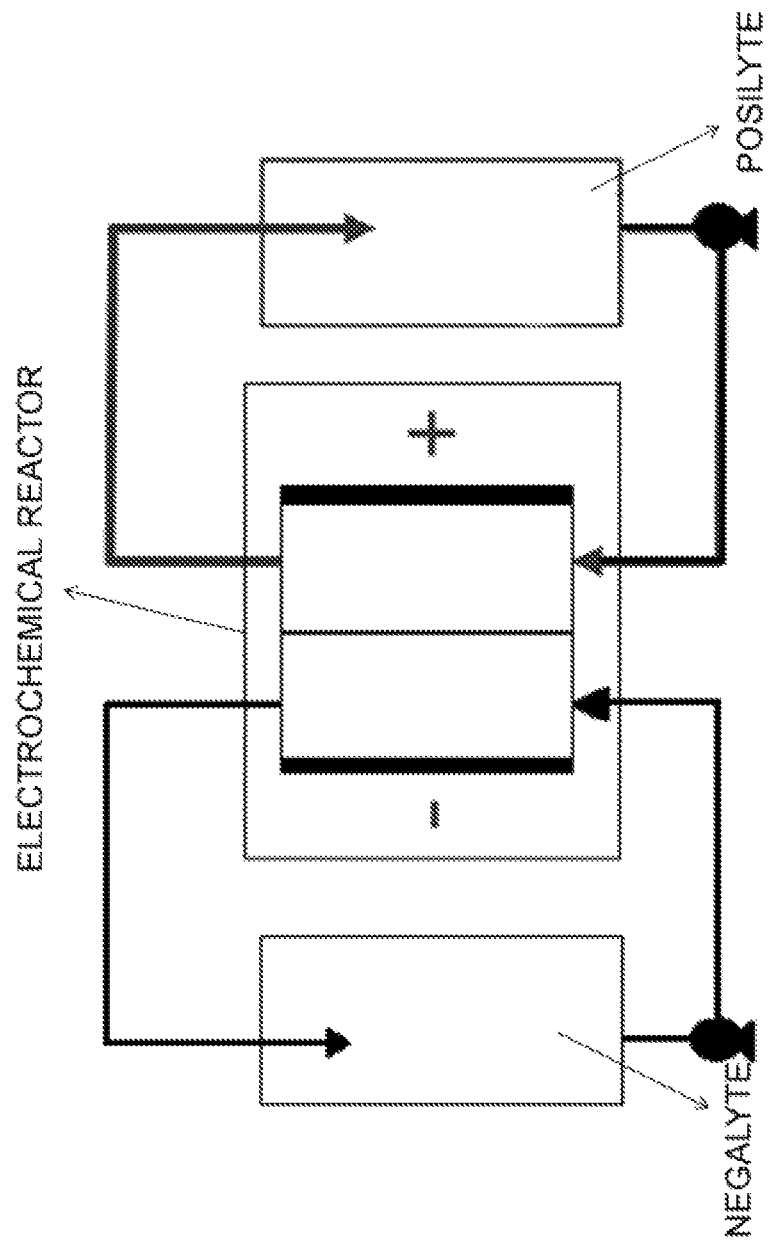
FIG. 2 shows the basic description of the acid-base electrochemical flow battery, ABEFB.
Figure 3:
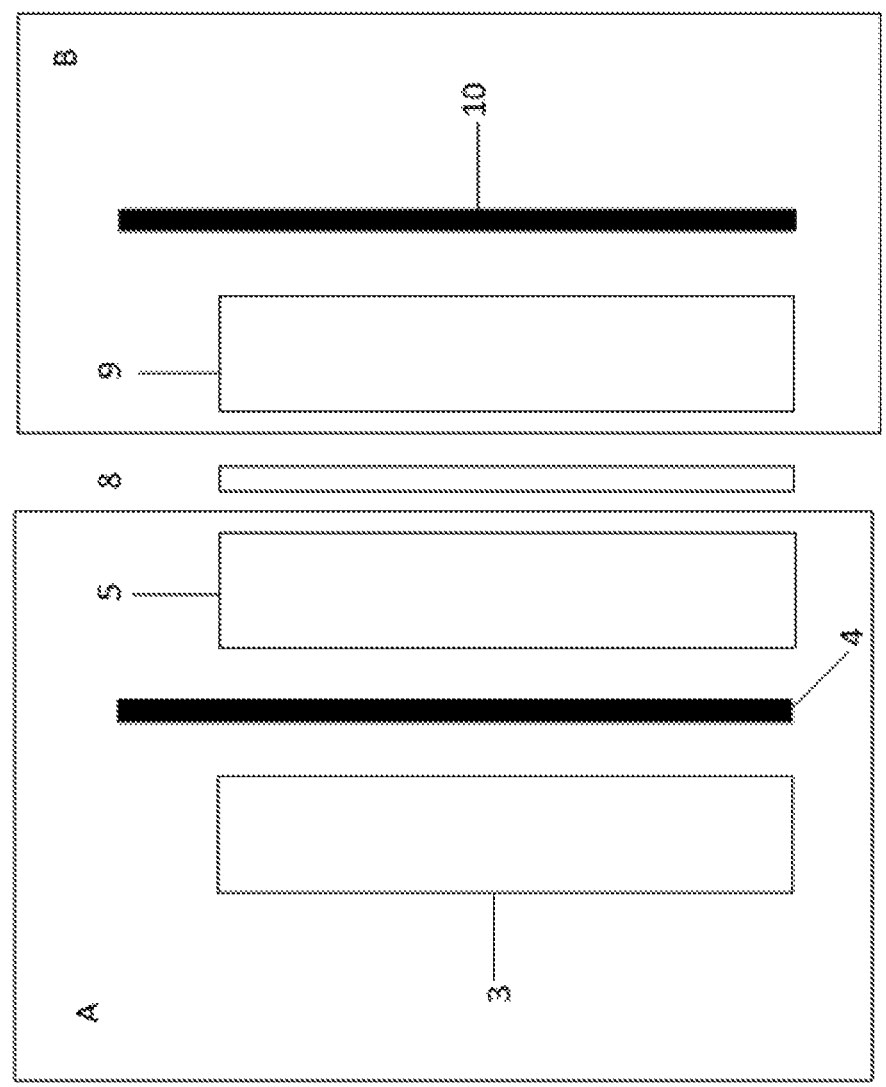
FIG. 3 shows a diagram of each of the parts of the electrode structure used.

The operation of this battery is based on the potential difference between two electrodes submerged in two solutions with different pH values, one of them being a strongly acidic solution and the other a strongly basic solution, and both with a supporting electrolyte at a concentration that is sufficient for the ion transport of the membrane to be performed by the ions thereof. An oxidation reaction in which molecular hydrogen is oxidized to a proton and a reduction reaction in which the proton or water is reduced to molecular hydrogen, both of which are highly reversible processes, occur in the electrodes. The acidity and basicity of the initial solutions can be neutralized by extracting electrical energy (discharging) or increased by supplying electrical energy (charging). Putting the strongly acidic solution in contact with the strongly basic solution (both with a supporting electrolyte at a specific concentration) by means of an ion exchange membrane gives rise to a potential difference between the ends of the electrodes of about 0.8 V (this value depends on the difference in pH between the two solutions). Any acid can be used for the acidic solution, although it is preferable to use one of those acids known as strong acids. Any base can be used for the basic solution, although it is preferable to use one of those bases known as strong bases. Any highly soluble salt, and preferably those the ionic mobility of which is very high, can be used as a background electrolyte. The discharging of this cell leads to the neutralization of the two solutions, so the acidic solution looses acidity and the basic solution looses alkalinity. Once the desired neutralization state has been reached, the solutions can be regenerated by applying an electric current. FIG. 3 shows a diagram of each of the parts of the electrode conformation in the battery of the present invention, namely:

1. A region, generically depicted as (A) in the diagram, in which the oxidation of hydrogen to hydronium ion occurs. This electrode structure must optimize both the electrocatalysis of the oxidation process and the mass supply of hydrogen to the catalytic surface. The low solubility of hydrogen in aqueous medium means that the electrode structure must increase the liquid/gas interface area in the catalytic layer in which oxidation occurs. In this sense, region (A) comprises: the electrode compartment (5) where the liquid phase, i.e., the posilyte or the negalyte, is located; the catalytic layer where the electrocatalyst suitable for the oxidation reaction of hydrogen (4) is located; and an electrode compartment (3) where the molecular hydrogen is present. In this approach, the surface (4) must be porous and hydrophobic as hydrogen must diffuse through said surface to react with the catalyst, but at the same time keep the liquid of compartment (5) separated from the gas of compartment (3). This structure may correspond to the structure of a gas diffusion electrode, which is widely used in hydrogen/oxygen fuel cells; however, the possibility of using other structures, in which the characteristics of material porosity, conductivity and electrocatalysis optimize the interaction of hydrogen (gas), electrocatalyst and hydronium ion in the oxidation reaction of hydrogen, is also taken into consideration.

2. An ion exchange membrane (8). This ion exchange membrane can be an anion exchange membrane or a cation exchange membrane, allowing only the transport of anions or cations, respectively. Any other non-selective separator can also be used with the sole drawback being a drop in battery efficiency.

3. A region, generically depicted as (B) in the diagram, in which hydrogen gas will be produced from the reduction of proton or water. Region B comprises: an electrode compartment (9) where the liquid phase, i.e., the posilyte or the negalyte, is located; and the catalyzed electrode (10) in which molecular hydrogen is produced. The reagent, water or hydronium ion is supplied to the electrode by diffusion-convection, which does not present any significant problem. Any catalyst that can be used for obtaining hydrogen by electrolysis can be used for this process in the ABEFB.

Figure 4:
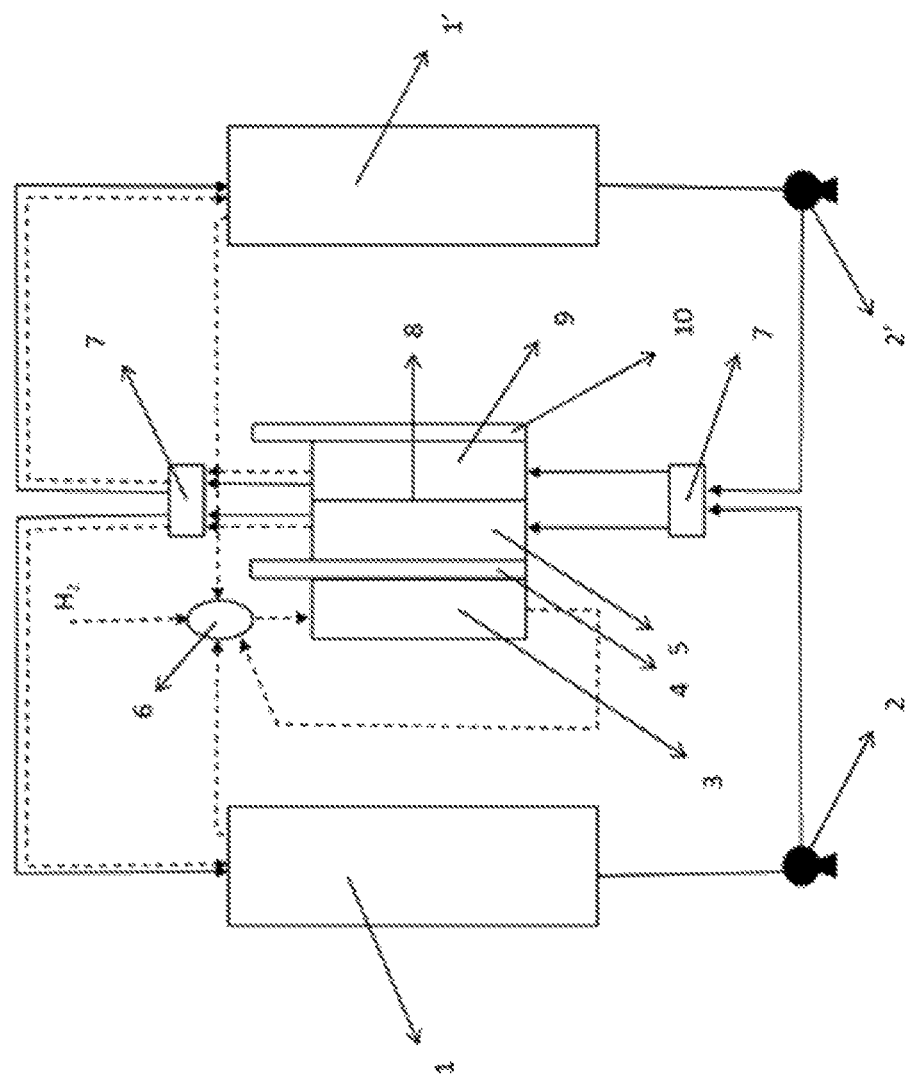
FIG. 4 shows a detailed diagram of the electrochemical battery for the accumulation of electrical energy based on a single compartment for each electrolyte: posilyte and negalyte.

Having described the electrode structure, a detailed diagram of each of the parts making up this battery is described in FIG. 4. Taking this diagram into account, the sequence of each of the steps that are carried out in the charging and discharging processes of the battery of the present invention is indicated in detail below:

Charging Process

1) The process begins with two solutions, one acidic and the other basic, the concentration of which may vary between 0.0001 M and 5 M, although these limits do not entail any limitation. Any acid can be used for the acidic solution, although it is preferable to use one of those acids known as strong acids. Any base can be used for the basic solution, although it is preferable to use of one of those bases known as strong bases. These initial solutions must contain a supporting electrolyte (soluble salt) at a concentration such that the ions of the supporting electrolyte perform the ionic conduction of the system. Any highly soluble salt, and preferably those the ionic mobility of which is very high, can be used as a background electrolyte. The solution with a known acid concentration, i.e., posilyte, is introduced into the tank defined as (1), and the solution with a known base concentration, i.e., negalyte, is introduced into the tank defined as (1').

2) The compartment (3) is then supplied with hydrogen by means of an external source; at this point the posilyte and negalyte are pumped to compartments (5) and (9), respectively, by means of hydraulic pumps (2, 2').

3) Once the system has been prepared, the charging process of the system, which can be carried out at a controlled potential or current, is started, acceptable values being a current density between 1 mA cm$^{-2}$ and 5 A cm$^{-2}$ or potentials between 1 and 3 V.

The reactions which occur in the electrodes are the oxidation of hydrogen to hydronium ion on the catalytic surface defined as (4) and the reduction of water to hydrogen on the catalytic surface defined as (10), where in said reactions:

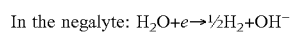

In the negalyte: $H_2O + e^- \rightarrow \tfrac{1}{2}H_2 + OH^-$

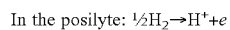

In the posilyte: $\tfrac{1}{2}H_2 \rightarrow H^+ + e^-$

The electrical circuit will be closed with the transport of the ions of the supporting electrolyte of both solutions through the ion exchange membrane defined by (8). The hydrogen generated in compartment (9), the unused excess hydrogen in compartment (3) and the hydrogen which may be present in compartment (5) are recovered to be reused using a gas distribution system defined as (6). Therefore, the hydrogen produced is consumed by the system itself, maintaining a closed cycle of hydrogen production/consumption.

4) In the charging process, the posilyte (a) will become increasingly more acidic with the charging step, and, likewise, the negalyte (b) will becomes increasingly more basic. For a given volume, the difference between the initial concentration and the final concentration of acid in the posilyte and of base in the negalyte, i.e., the difference in the final pH between the posilyte and negalyte, defines the electrical energy accumulation capacity of the battery.

Discharging Process

Figure 5:
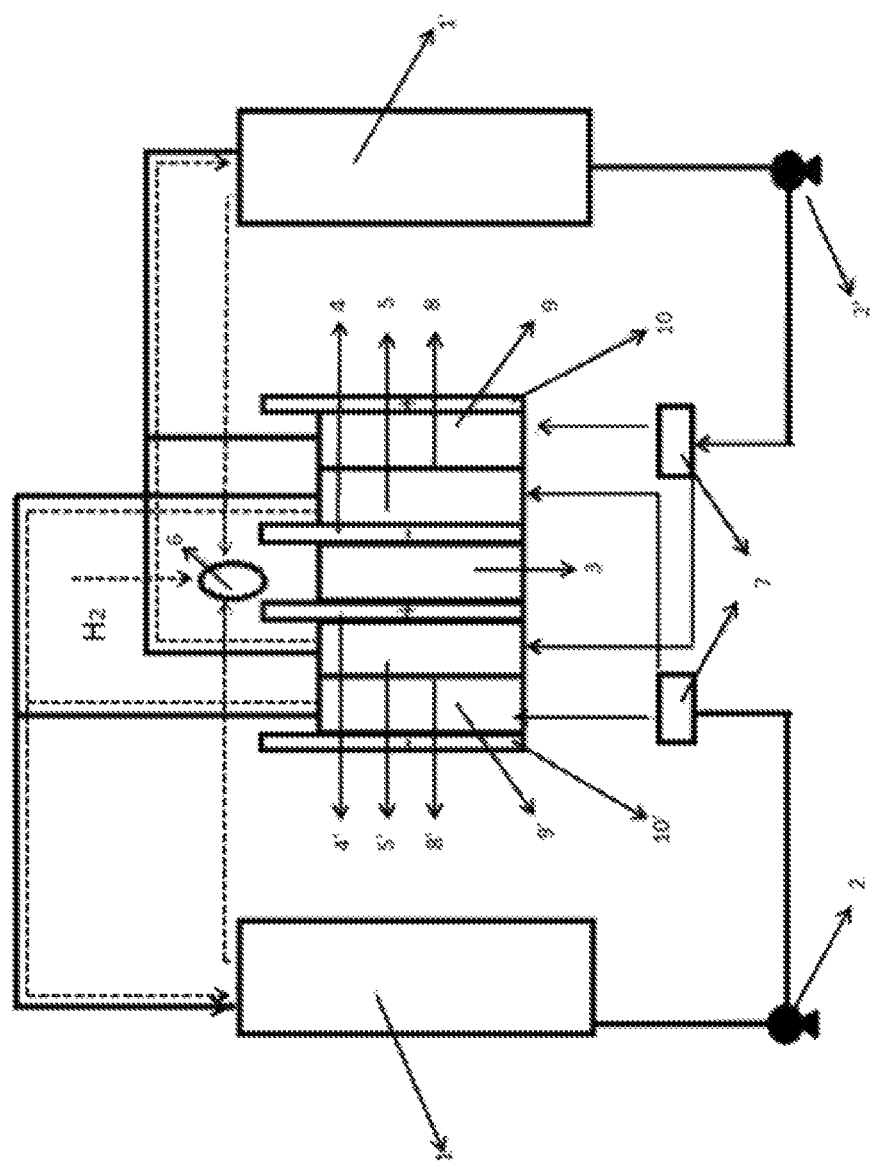
FIG. 5 shows a detailed diagram of the electrochemical battery for the accumulation of electrical energy based on two compartments for each electrolyte: posilyte and negalyte.

5) Once the desired final concentrations, which may be between 0.5 M and 4 M or greater, depending on the types of acid and base used, have been achieved, charging is stopped. The discharging of the system is performed by changing the compartments of the posilyte flow and negalyte flow through distribution valves defined as (7). The posilyte (a) is changed from compartment (5) to compartment (9), and the negalyte (b) is changed from compartment (9) to compartment (5). The compartment (3) has stabilized hydrogen pressure, so the supply of this reagent is assured. This change in the solutions causes an inversion of polarity of the electrodes, so discharging occurs spontaneously once the circuit is closed with a suitable resistance. Another possibility is to duplicate the system defined in FIG. 3 and use one of the systems for the charging process and another different system for the discharging process, defining an electrode conformation, and therefore a system that is different from that described in FIG. 5. In this system, there is a single compartment with the same characteristics as the compartment defined above as (3), and a duplication of compartments (5) and (9) which are defined in the drawing as (5') and (9'). Catalytic surfaces (4) and (10) have likewise been duplicated, defining surfaces (4') and (10'). In this case, surfaces (10') and (4) can be considered the negative electrode and surfaces (10) and (4') the positive electrode.

6) The system defined in any of the ways presented in paragraph 5, generates a potential difference at equilibrium which depends on the difference in pH between the posilyte and negalyte (~0.8 V), and therefore by establishing the discharging conditions, the system can be discharged by causing the circulation of the solutions and putting the corresponding solutions in contact with the catalytic surfaces. In this discharging process, hydrogen is oxidized in the electrode of the negalyte in the presence of the hydroxyl ion with the formation of water (4), and the hydronium ion is reduced in the electrode in contact with the posilyte with the production of hydrogen on the catalytic surface defined as (10), according to the following reactions:

In the negalyte: 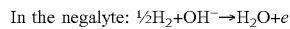

In the posilyte: 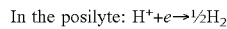

The negalyte is therefore acidified and the posilyte basified, so the solutions recover their initial state and another charging process can be started.

The charging/discharging cycles will be performed following the 6 steps defined above.

Example 1

In this example, a battery charging process is performed using 1 M NaOH and 1 M HCl as the posilyte and negalyte, respectively. Both solutions contain 2 M NaCl as the supporting electrolyte. The volume of the negalyte and posilyte is 50 ml. The electrode structure used is made up of a diffusion electrode formed by 20% wet-proofed Toray Paper TGPH-90 on which a microporous layer of a mixture of PTFE and Vulcan XC72 at a 60/40 weight ratio and a coating of 2.5 (mg Vulcan XC72) cm$^{-2}$ is deposited. A catalytic layer is constructed on this layer using Pt/C at 30% by weight as an electrocatalyst and Nafion as a binder at a 60/40 ratio, the final catalytic coating being 1 (mg Pt) cm$^{-2}$. This diffusion electrode is used in the oxidation reaction of hydrogen. Similarly, a platinized titanium electrode is used in the hydrogen formation reaction. Finally, the electrode geometric area of this system is 4 cm$^2$.

Figure 6:
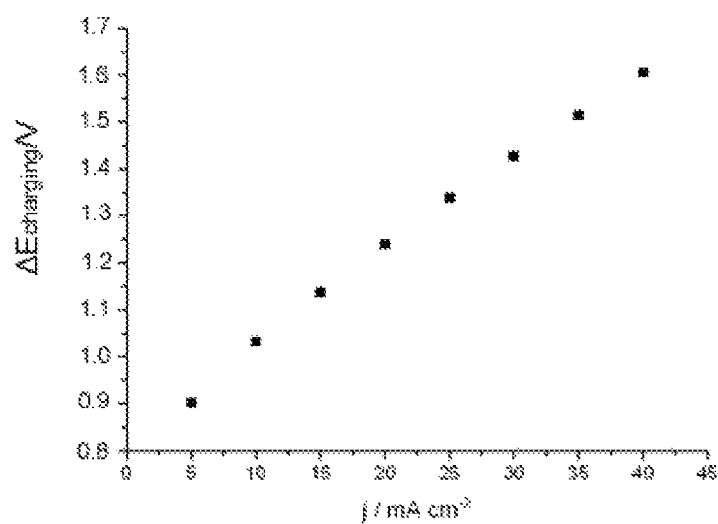
FIG. 6 shows a graphical depiction of the potential difference of the system as a function of current density in the charging process of Example 1.
Figure 7:
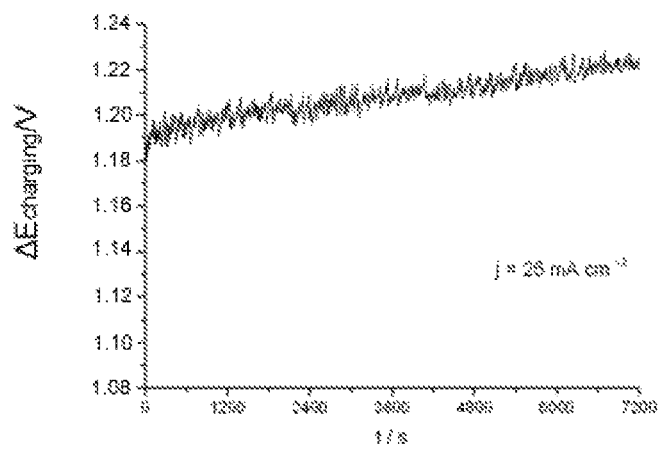
FIG. 7 shows a graphical depiction of the potential difference of the system as a function of time in the charging process at a current density of 25 mA cm$^{-2}$ of Example 1.

The polarization curve (FIG. 6) of the system was first obtained, and then charging was performed at a constant current density of 25 mA cm$^{-2}$ for 7200 seconds. FIG. 7 shows the evolution of voltage over time.

Example 2

In this example, a battery discharging process is performed using 1 M NaOH and 1 M HCl as the negalyte and posilyte, respectively. Both solutions contain 2 M NaCl as the supporting electrolyte. The volume of the negalyte and posilyte is 50 mL. The electrodes described above were used as electrodes.

Figure 8:
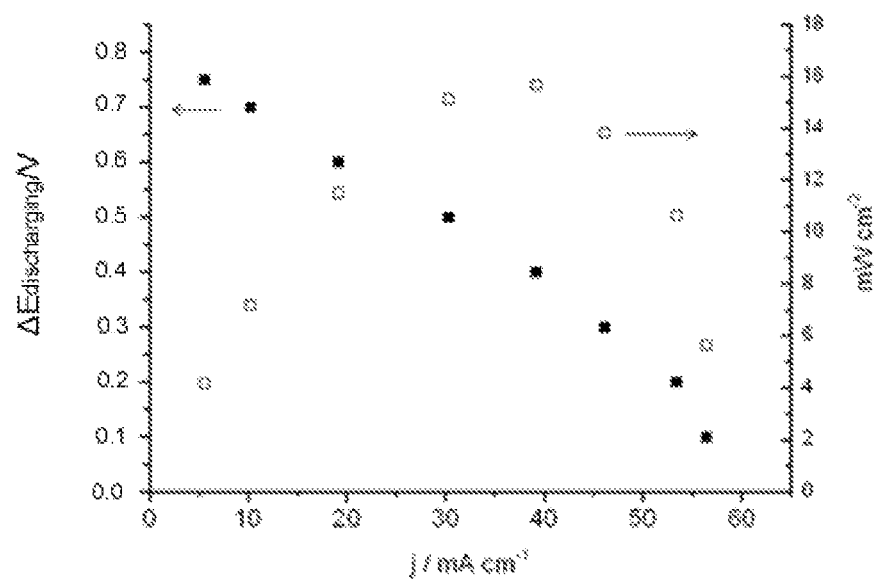
FIG. 8 shows a depiction of polarization curves and power curves of the system in the discharging process of Example 2.
Figure 9:
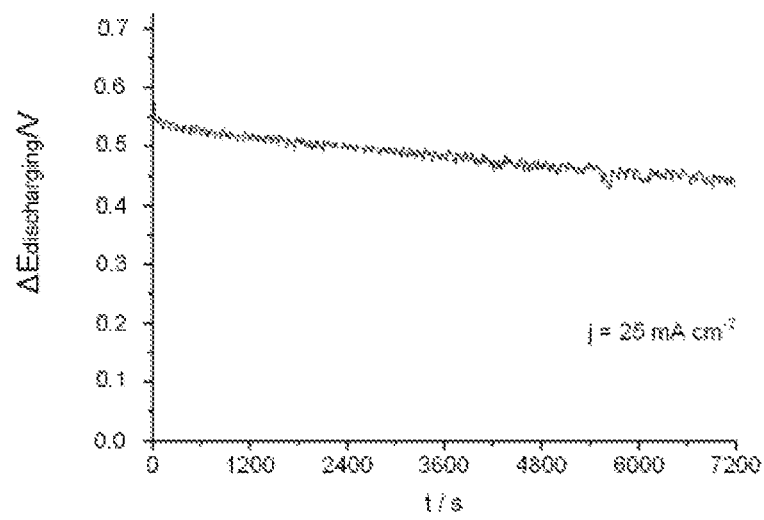
FIG. 9 shows a depiction of the potential difference of the system as a function of time in the discharging process at a current density of 25 mA cm$^{-2}$ of Example 2.

The polarization curve and power curve (FIG. 8) were first obtained, and then discharging was performed at a constant current density of 25 mA cm$^{-2}$ for 7200 seconds. FIG. 9 shows the evolution of the potential difference over time.

The invention claimed is:

1. A system for accumulation of electrical energy, comprising:
 a first electrode compartment comprising molecular hydrogen;
 a second electrode compartment comprising a liquid phase solution (a), wherein the liquid phase solution (a) comprises an acidic solution;
 a third electrode compartment comprising a liquid phase solution (b), wherein the liquid phase solution (b) comprises a basic solution;
 a first catalytic surface separating the first electrode compartment from the second electrode compartment, wherein the first catalytic surface comprises a first electrocatalyst configured to oxidize the molecular hydrogen to hydronium ion in response to a potential or a current being applied to the system during a charging process;
 a first ion exchange membrane configured to separate the second electrode compartment from the third electrode compartment; and
 a second catalytic surface arranged in contact with a free end of the third electrode compartment, wherein the second catalytic surface comprises a second electrocatalyst configured to reduce water to hydrogen in response to the potential or the current being applied to the system,
 wherein both liquid phase solution (a) and the liquid phase solution (b) comprise a soluble salt as a supporting electrolyte, wherein ions of the soluble salt as the supporting electrolyte perform ion transport through the first ion exchange membrane, wherein the liquid phase (a) becomes increasingly acidic and the liquid phase (b) becomes increasingly basic in response to the potential or the current being applied to the system and a difference in a pH value between the liquid phase (a) and the liquid phase (b) defines the electrical energy accumulated by the system, and, wherein a closed cycle of hydrogen production and hydrogen consumption is maintained by capturing the hydrogen generated in the third electrode compartment by the second catalytic surface, any unused molecular hydrogen in the first electrode compartment, and any hydrogen in the second electrode compartment.

2. The system according to claim 1, further comprising a first and second tank configured to accumulate the liquid phase solution (a) and the liquid phase solution (b), respectively.

3. The system according to claim 1, further comprising at least a first drive pump for distributing the liquid phase solution (a) from a first tank to the second electrode compartment and a second drive pump for distributing the liquid phase solution (b) from a second tank to the third electrode compartment.

4. The system according to claim 1, further comprising a gas distribution system distributing molecular hydrogen flow through the system to maintain the closed cycle of hydrogen production and hydrogen consumption.

5. The system according to claim 1, further comprising at least one valve system distributing liquid flow through the system.

6. The system according to claim 1, further comprising:
a fourth electrode compartment configured to receive the liquid phase solution (b) from the third electrode compartment;
a fifth electrode compartment configured to receive the liquid phase solution (b) from the second electrode compartment;
a third catalytic surface comprising an electrocatalyst for a second oxidation reaction and configured to separate a free end of the first electrode compartment from the fourth electrode compartment; and
a second ion exchange membrane configured to separate the fourth electrode compartment from the fifth electrode compartment.

7. A method for accumulating electrical energy in a system, the method comprising:
supplying a first electrode compartment with molecular hydrogen;
introducing an acidic solution into a second electrode compartment and a basic solution into a third electrode compartment, wherein both the acidic solution and the basic solution comprise a soluble salt as a supporting electrolyte to perform ion transport and supply the first electrode compartment with hydrogen, wherein the acidic solution and the basic solution are in respective initial states;
performing a charging process by applying an electric current to the system;
oxidizing hydrogen to hydronium ion on a first catalytic surface separating the first electrode compartment from the second electrode compartment and comprising a first electrocatalyst in response to the electric current being applied;
reducing water to hydrogen on a second catalytic surface arranged in contact with a free end of the third electrode compartment and comprising a second electrocatalyst in response to the electric current being applied;

causing transport of ions of the supporting electrolyte of both the acidic solution and the basic solution through a first ion exchange membrane configured to separate the second electrode compartment from the third electrode compartment in response to the electric current being applied, wherein the acidic solution becomes increasingly acidic and the basic solution becomes increasingly basic in response to the electric current being applied to the system and a difference in a pH value between the acidic solution and the basic solution defines the electrical energy accumulated by the system;

redirecting excess unconsumed hydrogen in the first electrode compartment and the hydrogen generated in the third electrode compartment to the first electrode compartment by means of a gas distribution system to maintain a closed cycle of hydrogen production and hydrogen consumption by the system; and performing a discharging process by discharging the electrical energy through a neutralization reaction of the acidic solution and the basic solution.

8. The method according to claim 7, wherein the first ion exchange membrane is one of a cation exchange membrane, an anion exchange membrane, or a non-selective separator.

9. The method according to claim 7, further comprising:
introducing the acidic solution into a first tank and the basic solution into a second tank; and
pumping by means of action of pumps the acidic solution to the second electrode compartment and the basic solution to the third electrode compartment.

10. The method according to claim 7, wherein the discharging process comprises:
stopping the charging process, changing the basic solution from the third electrode compartment to the second electrode compartment and the acidic solution from the second electrode compartment to the third electrode compartment;
generating a potential difference at the first catalytic surface and the second catalytic surface created by a difference in pH between the acidic solution and the basic solution; and
generating water on the first catalytic surface and generating hydrogen on the second catalytic surface, wherein the acidic solution and the basic solution return to the respective initial states.

11. The method according to claim 7, wherein the discharging process comprises:
stopping the charging process, changing the basic solution from the third electrode compartment to a fourth electrode compartment and the acidic solution from the second electrode compartment to a fifth electrode compartment;
generating a potential difference at a third catalytic surface and a fourth catalytic surface created by a difference in pH between the acidic solution and the basic solution, wherein the third catalytic surface is configured to separate the first electrode compartment from the fourth electrode compartment, and wherein the fourth catalytic surface is arranged in contact with a free end of the fifth electrode compartment; and
generating water on the third catalytic surface and generating hydrogen on the fourth catalytic surface, wherein the acidic solution and the basic solution return to the respective initial states.

12. The system of claim 1, wherein the liquid phase (a) and the liquid phase (b) become increasingly neutral during a discharging process of the system.

\* \* \* \* \*